United States Patent [19]
Kobayashi et al.

[11] Patent Number: 4,986,648
[45] Date of Patent: * Jan. 22, 1991

[54] LENS AND OPTICAL DISC BASE PLATE OBTAINED FROM COPOLYMER OF NORBORNYL (METH)ACRYLATE

[75] Inventors: Akihiro Kobayashi; Toshiyuki Fujita; Takayuki Saito, all of Hitachi; Hiromasa Kawai, Ichihara; Yutaka Hosoi, Mito; Hideaki Shibata, Chiba, all of Japan

[73] Assignee: Hitachi Chemical Company, Ltd., Tokyo, Japan

[*] Notice: The portion of the term of this patent subsequent to Sep. 19, 2006 has been disclaimed.

[21] Appl. No.: 287,018

[22] Filed: Dec. 21, 1988

Related U.S. Application Data

[63] Continuation of Ser. No. 63,299, Jun. 18, 1987, Pat. No. 4,868,261.

[51] Int. Cl.⁵ .................. G02C 7/04; C08F 220/12
[52] U.S. Cl. .................. 351/160 R; 350/409; 360/135; 346/137; 369/288; 526/262; 526/282
[58] Field of Search ............... 526/262, 282; 369/288; 264/1.1; 350/96.34, 417, 409; 360/135; 346/137; 351/160 R

[56] References Cited

U.S. PATENT DOCUMENTS 3,243,416  3/1966  Caldwell et al. .................. 526/282

FOREIGN PATENT DOCUMENTS 0115605  6/1985  Japan .................. 526/282

Primary Examiner—Fred Teskin
Attorney, Agent, or Firm—Antonelli, Terry, Stout & Kraus

[57] ABSTRACT

An optical resin material comprising a polymer containing as an essential component at least one norbornyl acrylate or methacrylate or a derivative thereof is excellent in properties, particularly in moisture resistance and can be used for molding optical elements such as lenses, optical discs, etc.

2 Claims, No Drawings

LENS AND OPTICAL DISC BASE PLATE OBTAINED FROM COPOLYMER OF NORBORNYL (METH)ACRYLATE

This is a continuation of application Ser. No. 063,299, filed June 18, 1987, now U.S. Pat. No. 4,868,261.

BACKGROUND OF THE INVENTION

This invention relates to an optical resin material excellent in transparency, moldability, heat resistance and moisture resistance and suitable for optical element materials with low birefringence and high reciprocal dispersion.

As transparent thermoplastic resins, particularly resins for optical elements, there have been known poly(methyl methacrylate), polystyrene, polycarbonate and the like. But transparent resins satisfying all the required properties, that is, low birefringence, low moisture absorption, good molding and processing properties as well as transparency and heat resistance, have not been obtained yet.

For example, poly(methyl methacrylate) is excellent in transparency and low birefringence, and high in reciprocal dispersion, and thus a relatively excellent material. However, it has a problem in that a dimensional change readily takes place during use due to large moisture absorbing properties. Polystyrene resins are very small in moisture absorption but large in birefringence and easily bring about a change in transparency with the lapse of time. Therefore, such resins are not suitable as materials for optical elements. Polycarbonate resins are very excellent in heat resistance and excellent in moisture resistance but large in birefringence and slightly inferior in transparency. Further, since polystyrene and polycarbonate are low in reciprocal dispersion, when these resins are used as optical lenses, it is difficult to use them as master lenses which control the performance of optical system.

Among these resins, poly(methyl methacrylate) resins have high possibility of being used for optical uses. In order to improve the moisture resistance of poly(methyl methacrylate) resins, various proposals have been disclosed, for example, in Japanese Patent Unexamined Publication Nos. 58-5318, 58-5354, 58-11515, 58-13652, and 59-122509. One example of these proposals is a process for copolymerizing cyclohexyl methacrylate, benzyl methacrylate or a higher alkyl ester of methacrylic acid with methyl methacrylate. According to these proposals, the moisture resistance of the poly(methyl methacrylate) resins may be improved considerably but is still insufficient as optical element materials, while the heat resistance is remarkably lowered.

On the other hand, a polymer containing tricyclo[5.2.1.0$^{2,6}$]deca-8-yl acrylate or methacrylate as an essential component is disclosed in U.S. Pat. No. 4,591,626 as an optical resinous material excellent in moisture resistance and heat resistance. However, said polymer is still insufficient for providing high impact molded articles.

SUMMARY OF THE INVENTION

It is an object of this invention to provide an optical resin material overcoming the disadvantages of prior art materials.

This invention provides an optical resin material comprising a polymer containing as an essential component at least one unsaturated carboxylic acid ester of the formula:

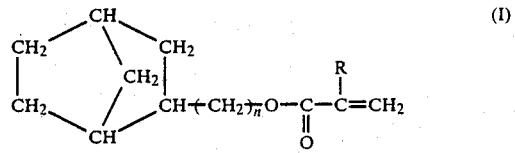

wherein R is hydrogen or a methyl group; n is zero or an integer of 1.

DESCRIPTION OF THE PREFERRED EMBODIMENTS

The polymer used in this invention means a homopolymer of an unsaturated carboxylic acid ester of the formula:

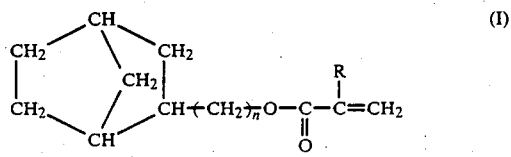

wherein R is hydrogen or a methyl group; n is zero or an integer of 1, a copolymer of two or more different kinds of unsaturated carboxylic acid esters of the formula (I), and a copolymer of one or more unsaturated carboxylic acid esters of the formula (I) and one or more other polymerizable unsaturated monomers.

As the other polymerizable unsaturated monomers, there can be used unsaturated carboxylic acid esters [other than those represented by the formula (I)], aromatic vinyl compounds, vinyl cyanide compounds, N-substituted maleimides, etc.

Examples of the unsaturated carboxylic acid esters are alkyl acrylates such as methyl acrylate, ethyl acrylate, butyl acrylate, 2-ethylhexyl acrylate, stearyl acrylate, etc.; cycloalkyl acrylates such as cyclohexyl acrylate, tricyclo[5.2.1.0$^{2,6}$]deca-8-yl acrylate, etc.; aromatic esters of acrylic acid such as phenyl acrylate, benzyl acrylate, etc.; acrylic esters such as glycidyl acrylate, etc.; alkyl methacrylates such as methyl methacrylate, ethyl methacrylate, propyl methacrylate, butyl methacrylate, hexyl methacrylate, 2-ethylhexyl methacrylate, stearyl methacrylate, etc.; cycloalkyl methacrylates such as cyclohexyl methacrylate, tricyclo[5.2.1.0$^{2,6}$]deca-8-yl methacrylate, etc.; aromatic esters of methacrylic acid such as phenyl methacrylate, benzyl methacrylate, etc.; methacrylic esters such as glycidyl methacrylate, etc.

Examples of the aromatic vinyl compounds are styrene, α-substituted styrenes such as α-methylstyrene, α-ethylstyrene, etc.; nucleus substituted styrenes such as chlorostyrene, vinyltoluene, t-butylstyrene, etc.

Examples of the vinyl cyanide compounds are acrylonitrile, methacrylonitrile, etc.

Examples of the N-substituted maleimides are aliphatic N-substituted maleimides e.g. N-alkylmaleimides such as N-methylmaleimide, N-ethylmaleimide, N-isopropylmaleimide, N-butylmaleimide, N-laurylmaleimide, etc.; alicyclic N-substituted maleimides e.g. N-cycloalkylmaleimides such as N-cyclohexylmaleimide, etc.; aromatic N-substituted maleimides e.g. N-arylmaleimides such as N-phenylmaleimide, N-methylphenylmaleimide, N-chlorophenylmaleimide, N-methoxyphenylmaleimide, etc.

In order to obtain the polymer excellent in transparency, moldability, heat resistance and moisture resistance, low in birefringence and high in reciprocal dispersion, it is preferable to compound monomers to be polymerized as follows:

| | |
|---|---|
| Unsaturated carboxylic acid ester of the formula (I) | 100–5% by weight |
| Other polymerizable unsaturated monomer | 0–95% by weight |
| More preferable range is as follows: | |
| Unsaturated carboxylic acid ester of the formula (I) | 80–30% by weight |
| Other polymerizable unsaturated monomer | 20–70% by weight |

If the amount of the unsaturated carboxylic acid ester of the formula (I) is too small, it becomes difficult to attain the above-mentioned excellent properties or to improve these properties.

Among the other polymerizable unsaturated monomers mentioned above, methyl methacrylate, ethyl acrylate, butyl acrylate, aliphatic N-substituted maleimides, alicyclic N-substituted maleimides are particularly preferable.

Further, among the unsaturated carboxylic acid esters of the formula (I), those having n=0 in the formula (I) are more preferable than those having n=1 in the formula (I), since the former can yield polymers having higher heat resistance without lowering the other properties and has a larger selectivity for other copolymerizable monomers.

As to the properties of the polymer thus obtained in this invention, the following ones are preferable.

The moisture resistance can be evaluated by a saturated water absorption rate, a smaller value of which is more preferable. The saturated water absorption rate of 1.3% by weight or less is preferable [cf. 2.2% by weight in the case of poly(methyl methacrylate)].

The heat resistance can be evaluated by a glass transition point, a larger value of which is more preferable. The glass transition point is preferably 95° C. or more, more preferably 120° C. or more, in terms of endothermic peak temperature measured by using a differential scanning colorimeter (DSC).

The molecular weight is preferably in the range of 10,000 to 1,000,000 in weight average molecular weight ($\overline{M}w$) from the viewpoint of moldability and heat resistance, strength and the like of molded articles.

The birefringence is a phenomenon exhibited by a medium in which an incident ray of light is polarized into two rays, called an ordinary ray plane and an extraordinary plane ray plane, and transmitted with different rates. When the optical resin material of this invention is used as a base plate for optical discs, a large birefringence causes undesirably noises. Therefore, the birefringence of 20 nm or less is particularly preferable in this case.

On the other hand, when the optical resin material of this invention is used for forming lenses, a larger Abbe number which indicates the reciprocal dispersion is preferable. Thus, the Abbe number of 50 or more is preferable.

The polymer for the optical resin material can be produced by a conventional polymerization method such as radical polymerization, ionic polymerization, or the like. In addition, the polymer can also be produced by bulk polymerization, solution polymerization, suspension polymerization or the like in the presence of a polymerization initiator. When the polymer is used for optical elements which dislike the contamination of impurities, the bulk polymerization or suspension polymerization is preferable.

As the polymerization initiator, there can be used those conventionally used for ordinary radical polymerization, for example, organic peroxides such as benzoyl peroxide, lauroyl peroxide, di-t-butylperoxy hexahydroterephthalate, t-butylperoxy-2-ethylhexanoate, 1,1-di-t-butylperoxy-3,3,5-trimethylcyclohexane, etc.; azo compounds such as azobisisobutyronitrile, azobis-4-methoxy-2,4-dimethylvaleronitrile, azobiscyclohexanone-1-carbonitrile, azodibenzoyl, etc.; water-soluble catalysts such as potassium persulfate, ammonium persulfate, etc.; and redox catalysts such as a combination of a peroxide or persulfate and a reducing agent. The polymerization catalyst can preferably be used in an amount of 0.01 to 10% by weight based on the total weight of the monomers.

As the polymerization regulator, there can be used mercaptan series compounds, thioglycols, carbon tetrabromide, α-methylstyrene dimer, etc. to regulate the molecular weight depending on purposes.

The polymerization temperature is preferably in the range of 0° to 200° C., more preferably 50° to 120° C.

As the solvent in the solution polymerization, there can be used benzene, toluene, xylene, methyl ethyl ketone, methyl isobutyl ketone, ethyl acetate, butyl acetate, dichloroethylene, etc.

The suspension polymerization is carried out in an aqueous medium and a suspending agent and, if necessary, a suspending auxiliary are added thereto. Examples of the suspending agent are water-soluble high polymers such as polyvinyl alcohol, methyl cellulose, polyacrylamide, etc.; difficultly soluble inorganic substances such as calcium phosphate, magnesium pyrophosphate, etc. The water-soluble high polymer is preferably used in an amount of 0.03 to 1% by weight based on the total weight of the monomers. On the other hand, the difficultly soluble inorganic substance is preferably used in an amount of 0.05 to 0.5% by weight based on the total weight of the monomers. As the suspending auxiliary, there can be used anionic surface active agents such as sodium dodecylbenzene sulfonate, etc. When a difficultly soluble inorganic substance is used as the suspending agent, it is better to co-use the suspending auxiliary. The suspending auxiliary is preferably used in an amount of 0.001 to 0.02% by weight based on the total weight of the monomers.

The unsaturated carboxylic acid ester of the formula (I) can be synthesized by a conventional method for synthesizing methacrylic acid esters and acrylic acid esters.

For example, norbornyl methacrylate or norbornyl acrylate, which has n=0 in the formula (I), can be obtained by adding $H_2O$ to norbornene, or adding formic acid or acetic acid to norbornene, hydrolyzing to yield norborneol, and esterifying with methacrylic acid or acrylic acid. The esterification can be carried out by a condensation reaction of norborneol with methacrylic acid, acrylic acid, methacrylic chloride or acrylic chloride; or an ester exchange reaction with methyl methacrylate, methyl acrylate, ethyl acrylate, etc.

When n=1 in the formula (I), norbornylmethyl methacrylate and norbornylmethyl acrylate are shown.

These compounds can be synthesized by forming norbornyl methanol from 5-norbornene-2-methanol by a catalytic hydrogenation reaction, and changing the norbornyl methanol to the desired acrylic ester and methacrylic ester in the same manner as mentioned above.

The optical resin material of this invention can take any forms of polymers such as random copolymers, alternating copolymers, graft copolymers, block copolymers, polymer blends so long as the transparency is not damaged.

The optical resin material of this invention can be blended with one or more poly(methyl methacrylate) resins, polystyrenes, the optical resin materials disclosed in U.S. Pat. No. 4,591,626, polycarbonates, and the like, so long as the properties of the optical resin material of this invention are not lowered.

Further, the optical resin material of this invention may further contain one or more antioxidants of phenolic compounds, phosphite compounds, thioether compounds, etc., mold release agents such as aliphatic alcohols, fatty acid esters, phthalic esters, triglycerides, fluorine series surface active agents, higher fatty acid metal salts, etc., lubricating agents, plasticizers, antistatic agents, ultraviolet absorbers, fire retardants, heavy metal inactivating agents, etc., conventionally used.

The optical resin material of this invention can be molded by conventional injection molding, compression molding, a micromold method, a floating mold method, a rolling method, casting, or the like. In the case of casting, monomers are partially polymerized first and then placed in a mold to carry out the final polymerization, and the optical resin material of this invention is obtained at the same time of obtaining a molded article.

The thus molded articles can further be improved in moisture resistance, optical properties, chemical resistance, wear resistance, and defogging by coating the surfaces of these articles with inorganic compounds such as $MgF_2$, $SiO_2$, etc. by a vacuum evaporation method, a sputtering method, an ion plating method, etc., or by hard coating the surfaces of these articles with organic silicone compounds such as silane coupling agents, vinyl monomers, melamine resins, epoxy resins, fluorine series resins, silicone resins, etc.

The optical resin material of this invention can be molded into various optical elements by the abovementioned methods. Examples of the optical elements are lenses for common cameras, video cameras, telescopes, laser beams, projectors, ophthalmology, collecting the sunlight, optical fibers, etc.; prisms such as pentaprisms; light-piping elements such as optical fibers, optical guides, etc.; elements which exhibit functions by passing the light through such as discs, for example, optical videodiscs, audiodiscs, document file discs, memory discs, etc.

The polymer used in the optical resin material of this invention comprises as an essential component at least one unsaturated carboxylic acid ester of the formula (I), so that it is excellent in optical dispersibility, moisture resistance, heat resistance and impact strength. In order to exhibit such excellent properties, the polymer contains as the essential component the compound of the formula (I) in an amount of preferably 5% by weight or more, more preferably 30 to 80% by weight. Further, desirable optical dispersibility, moisture resistance, heat resistance and impact strength can be attained by properly selecting the proportion of the compound of the formula (I) in the polymer or the kind of other copolymerizable monomer. The desired optical dispersibility, moisture resistance and heat resistance are remarkably attained in the case of homopolymers of compounds of the formula (I), copolymers of two or more compounds of the formula (I), and copolymers containing as a major component the compound of the formula (I). The above-mentioned properties can be attained by polymerizing the compound of the formula (I) in an amount of preferably 5% by weight or more, more preferably 30 to 80% by weight.

The compounds represented by the formula (I) have no double bonds other than polymerizing portions, so that when monomers having no double bonds other than polymerizing portions are used, the resulting polymer is excellent in resistance to light. Further, when monomers having no aromatic ring are used as the other copolymerizable monomer, the resulting polymer can provide articles excellent in birefringence.

This invention is illustrated by way of the following Examples, in which all parts and percents are by weight unless otherwise specified.

EXAMPLES 1 TO 6, REFERENCE EXAMPLE 1

In a triangular flask equipped with a three-way stop cock, monomers as listed in Table 1 in an amount of 100 parts, 0.4 part of lauroyl peroxide and 0.2 part of n-dodecylmercaptan were placed, and mixed and dissolved. After replacing the air in the flask by nitrogen gas, the flask was dipped in a constant temperature water bath heated at 60° C. while agitating the flask and subjected to polymerization for 30 minutes in a nitrogen stream to give a partially polymerized material. Then, the partially polymerized material was poured into a glass cell, wherein the polymerization was carried out at 60° C. for 4 hours and at 100° C. for 5 hours to yield a polymer in a transparent sheet form. Then the polymer was subjected to the measurement of total light beam transmittance, saturated water absorption rate, refractive index and Abbe number.

The polymer in an amount of 100 g was dissolved in 200 g of tetrahydrofran, and the resulting solution was poured into 5 liters of methanol with stirring to precipitate and deposit the polymer, which was separated by filtration to yield the polymer in a white powder. The polymer was subjected to the measurement of a glass transition point.

The above-mentioned results are shown in Table 1.
The properties were evaluated as follows:
Total light beam transmittance (%): ASTM D-1003
Saturated water absorption rate (%): ASTM D570
Refractive index, Abbe number: measured by using an Abbe refractometer (mfd. by Eruma Kogaku K.K.)
Glass transition point (Tg)(°C.): measured by using a differential scanning calorimeter (DSC) (endothermic peak temperature)
Birefringence: measured by using an ellipsometer (a single pass meter)
Evaluation:     20 nm or less
Δ 20–40 nm
X 40 nm or more
Impact strength: a molded plate was dropped from a height of 1 m and the generation of cracks was observed.
Evaluation:     no cracks
Δ partly cracked
X cracked.

TABLE 1

|  |  | Example |  |  |  |  |  | Reference Example |
|---|---|---|---|---|---|---|---|---|
| Example No. |  | 1 | 2 | 3 | 4 | 5 | 6 | 1 |
| Monomers (parts) | Norbornyl methacrylate | 100 | — | — | — | — | — | — |
|  | Norbornylmethyl methacrylate | — | 100 | — | — | 70 | 50 | — |
|  | Norbornyl acrylate | — | — | 100 | — | — | — | — |
|  | Norbornylmethyl acrylate | — | — | — | 100 | — | — | — |
|  | Methyl methacrylate | — | — | — | — | 30 | 50 | 100 |
| Properties | Total light beam transmittance (%) | 92 | 92 | 92 | 92 | 92 | 93 | 93 |
|  | Saturated water absorption rate (%) | 0.2 | 0.2 | 0.2 | 0.2 | 0.6 | 1.0 | 0.2 |
|  | Refractive index | 1.512 | 1.515 | 1.498 | 1.502 | 1.507 | 1.502 | 1.490 |
|  | Abbe number | 60 | 59 | 60 | 60 | 58 | 58 | 57 |
|  | Birefringence |  |  |  |  |  |  |  |
|  | Yield of powder copolymer (%) | 97 | 98 | 96 | 97 | 97 | 97 | 97 |
|  | Tg (°C.) | 143 | 135 | 102 | 96 | 128 | 123 | 115 |

EXAMPLES 7 TO 14, REFERENCE EXAMPLES 2 TO 6

| Component I |  |
|---|---|
| Monomers (listed in Table 2) | 100 parts |
| Lauroyl peroxide | 0.4 part |
| n-Dodecylmercaptan | 0.2 part |
| Component II |  |
| Deionized water | 270 parts |
| Tricalcium phosphate | 30 parts |
| (10% aqueous suspension) |  |
| Sodium dodecylbenzene sulfonate | 0.015 part |
| Sodium sulfate | 0.3 part |

In a reactor, the component I and component II were placed and mixed with stirring, while the atmosphere in the reactor was replaced by a nitrogen gas. The polymerization was carried out at 60° C. for 2 hours and at 98° C. for 4 hours. The conversion was 99%. The resulting polymer particles were filtered, subjected to repeated acid washing and water washing, dried and extruded to give pellets, which were provided as samples for evaluating properties. The results are shown in Table 2.

TABLE 2

|  |  | Example No. |  |  |  |  |  |  |  | Reference Example No. |  |  |  |  |
|---|---|---|---|---|---|---|---|---|---|---|---|---|---|---|
|  |  | 7 | 8 | 9 | 10 | 11 | 12 | 13 | 14 | 2 | 3 | 4 | 5 | 6 |
| Monomers or other ingredients (parts) | Norbornyl methacrylate | 100 | — | — | 50 | — | — | 90 | — | — | — | — | — | — |
|  | Norbornylmethyl methacrylate | — | 100 | — | — | 70 | 50 | — | 90 | — | — | — | — | — |
|  | Methyl methacrylate | — | — | 30 | 50 | 30 | 50 | — | — | 100 | — | 50 | 50 | 50 |
|  | n-Butyl acrylate | — | — | — | — | — | — | 10 | 10 | — | — | — | — | — |
|  | Cyclohexyl methacrylate | — | — | — | — | — | — | — | — | — | — | 50 | — | — |
|  | Benzyl methacrylate | — | — | — | — | — | — | — | — | — | — | — | 50 | — |
|  | Tricyclo[5.2.1.0²·⁶]-deca-8-yl methacrylate | — | — | — | — | — | — | — | — | — | — | — | — | 50 |
|  | Polycarbonate | — | — | — | — | — | — | — | — | — | 100 | — | — | — |
| Properties | Tg (°C.) | 143 | 135 | 133 | 129 | 128 | 123 | 121 | 114 | 115 | 152 | 96 | 82 | 135 |
|  | Total light beam transmittance (%) | 92 | 92 | 92 | 92 | 92 | 93 | 92 | 92 | 93 | 88 | 90 | 89 | 92 |
|  | Saturated water absorption rate (%) | 0.2 | 0.2 | 0.5 | 0.9 | 0.6 | 1.0 | 0.2 | 0.2 | 2.0 | 0.4 | 1.2 | 1.0 | 0.9 |
|  | Birefringence | o | o | o | o | o | o | o | o | o | X | o | o | o |
|  | Melt index (g/10 min) | 3.0 | 3.0 | 2.8 | 2.5 | 2.8 | 2.5 | 2.5 | 2.5 | 2.0 | 2.5 | 2.2 | 2.0 | 2.5 |
|  | Impact strength | Δ | Δ | o | o | o | o | o | o | o | o | X | X | X |

EXAMPLES 15 TO 24, REFERENCE EXAMPLE 7

The process of Example 7 was repeated except for using the monomers as listed in Table 3. The results are shown in Table 3.

TABLE 3

|  |  | Example No. |  |  |  |  |  |  |  |  |  | Reference Example 7 |
|---|---|---|---|---|---|---|---|---|---|---|---|---|
|  |  | 15 | 16 | 17 | 18 | 19 | 20 | 21 | 22 | 23 | 24 |  |
| Monomers (parts) | Norbornyl methacrylate | 60 | 40 | 35 | 45 | — | — | — | — | — | — | — |
|  | Norbornylmethyl methacrylate | — | — | — | — | 20 | 50 | 60 | 60 | 55 | 40 | — |
|  | Methyl methacrylate | 40 | 50 | 60 | 50 | 50 | — | — | — | 40 | 40 | — |
|  | Ethyl methacrylate | — | — | — | — | — | 40 | — | — | — | — | — |
|  | Cyclohexyl methacrylate | — | — | — | — | — | — | — | — | — | 20 | — |
|  | Tricyclo[5.2.1.0²·⁶]-deca-8-yl methacrylate | — | — | — | — | — | 30 | — | — | — | — | — |

TABLE 3-continued

|  |  | Example No. |  |  |  |  |  |  |  |  |  | Reference Example 7 |
|---|---|---|---|---|---|---|---|---|---|---|---|---|
|  |  | 15 | 16 | 17 | 18 | 19 | 20 | 21 | 22 | 23 | 24 |  |
|  | Styrene | — | — | — | — | — | — | 30 | 30 | — | — | 100 |
|  | Acrylonitrile | — | — | — | — | — | — | 10 | — | — | — | — |
|  | N-Ethylmaleimide | — | 10 | — | — | — | 10 | — | — | — | — | — |
|  | N-Cyclohexylmaleimide | — | — | 5 | 5 | — | — | — | — | — | — | — |
|  | Methacrylic acid | — | — | — | — | — | — | — | 10 | — | — | — |
|  | Stearyl acrylate | — | — | — | — | — | — | — | — | 5 | — | — |
| Properties | Tg (°C.) | 131 | 130 | 132 | 135 | 132 | 118 | 123 | 131 | 121 | 119 | 108 |
|  | Total light beam transmittance (%) | 91 | 90 | 91 | 90 | 92 | 92 | 91 | 91 | 93 | 93 | 90 |
|  | Saturated water absorption rate (%) | 0.8 | 1.1 | 1.0 | 0.8 | 0.9 | 0.7 | 0.5 | 0.7 | 0.7 | 0.7 | 0.1 |
|  | Birefringence | o | o | o | o | o | o | Δ | Δ | o | o | X |
|  | Melt index (g/10 min) | 2.8 | 2.5 | 2.5 | 2.8 | 2.5 | 2.8 | 3.5 | 2.2 | 3.2 | 2.8 | 10 |
|  | Impact strength | o | Δ | o | o | Δ | o | o | o | o | Δ | o |

APPLICATION EXAMPLE 1

The optical resin materials obtained in Examples 10, 12 and 17 and Reference Example 2 were injection molded at the resin temperature of 230° C. into lenses having a thickness at the central portion of 3 mm and a diameter of 14 mm. The obtained lenses were allowed to stand at 40° C. with a humidity of 100% RH for 6 hours for moisturizing to measure changes in face accuracy by moisture absorption by measuring the numbers of Newton's rings by an optical measuring method using a lens before and after moisture absorption and defining the face accuracy by moisture absorption by the difference in the numbers of Newton's rings.

The results are shown in Table 4.

TABLE 4

| Example No. | Face accuracy change by moisture absorption (difference in number) |
|---|---|
| Example 10 | 1 |
| Example 12 | 1 |
| Example 17 | 1 |
| Reference Example 2 | 3 |

APPLICATION EXAMPLE 2

The optical resin materials obtained in Examples 10 and 17 and Reference Example 2 were injection molded at the resin temperature of 260° C. into transparent base plates for disc plates having a diameter of 120 mm and a thickness of 1.2 mm. One side of a base plate was subjected vapor deposition of aluminum, followed by overcoating with a protective film by a conventional method. The thus produced disc plates were allowed to stand at 40° C. with a humidity of 100% RH for 24 hours. Then, the warpage (strain by moisture absorption) at the central portion of the disc plates and heat deformation temperature (HDT) were measured. The warpage was obtained by measuring the height of the central of a disc plate, the periphery of which was placed horizontally.

The results are shown in Table 5.

TABLE 5

| | Strain by moisture absorption (mm) | HDT (°C.) |
|---|---|---|
| Example 10 | 0.1 | 109 |
| Example 17 | 0.1–0.2 | 111 |
| Reference Example 2 | 1.5 | 97 |

As mentioned above, the polymer obtained in this invention is excellent in transparency, moldability, heat resistance, moisture resistance and impact strength and can also make the birefringence low and the reciprocal dispersion high.

What is claimed is:

1. A lens obtained by molding an optical resin material as an essential component, said optical resin material comprising a copolymer consisting essentially of one or more unsaturated carboxylic acid esters of the formula:

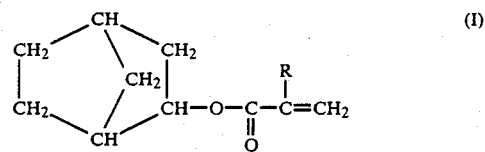

(I)

wherein R is hydrogen or a methyl group and at least one other polymerizable unsaturated monomer selected from the group consisting of monofunctional unsaturated carboxylic acid esters, aromatic vinyl compounds, N-alkylmaleimides, N-cycloalkylmaleimides and N-arylmaleimides.

2. A base plate of optical discs obtained by molding an optical resin material as an essential component, said optical resin material comprising a copolymer consisting essentially of one or more unsaturated carboxylic acid esters of the formula:

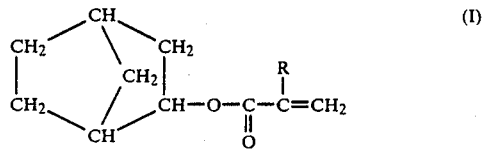

(I)

wherein R is hydrogen or a methyl group and at least one other polymerizable unsaturated monomer selected from the group consisting of monofunctional unsaturated carboxylic acid esters, aromatic vinyl compounds, N-alkylmaleimides, N-cycloalkylmaleimides and N-arylmaleimides.

* * * * *